US008606804B2

(12) United States Patent
Merz et al.

(10) Patent No.: US 8,606,804 B2
(45) Date of Patent: Dec. 10, 2013

(54) RUNTIME-DEFINED DYNAMIC QUERIES

(75) Inventors: Michael Merz, Redmond, WA (US); Alexander N. Samoylenko, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 12/535,688

(22) Filed: Aug. 5, 2009

(65) Prior Publication Data
US 2011/0035396 A1   Feb. 10, 2011

(51) Int. Cl.
*G06F 17/30* (2006.01)

(52) U.S. Cl.
USPC .......................................... 707/759; 707/779

(58) Field of Classification Search
USPC ........... 707/999.004, 999.005, 759, 765, 769, 707/779
See application file for complete search history.

(56) References Cited

U.S. PATENT DOCUMENTS

| | | | | |
|---|---|---|---|---|
| 6,356,887 B1 * | 3/2002 | Berenson et al. | ...... | 707/999.002 |
| 6,434,546 B1 * | 8/2002 | Williamowski et al. | ...... | 707/999.003 |
| 7,281,000 B2 * | 10/2007 | Kapoor et al. | ......... | 707/999.002 |
| 2005/0076015 A1 | 4/2005 | Dettinger et al. | | |
| 2005/0171934 A1 * | 8/2005 | Yuknewicz et al. | ................ | 707/3 |
| 2005/0182758 A1 | 8/2005 | Seitz et al. | | |
| 2006/0015483 A1 | 1/2006 | Gownder | | |
| 2006/0026116 A1 * | 2/2006 | Day et al. | ........................... | 707/1 |
| 2007/0078823 A1 * | 4/2007 | Ravindran et al. | ................. | 707/3 |
| 2008/0052266 A1 | 2/2008 | Goldstein et al. | | |
| 2008/0288918 A1 * | 11/2008 | Knura et al. | .................. | 717/106 |

OTHER PUBLICATIONS

William R. Cook & Siddhartha Rai, "Safe Query Objects: Statically Typed Objects as Remotely Executable Queries", ACM ICSE, May 15-21, 2005.*
"Building LINQ Queries at Runtime in C#", Retrieved at << http://tomasp.net/blog/dynamic-linq-queries.aspx >>.
"Dynamic Query", Retrieved at << http://www.jinfonet.com/manualpro/userguide/dynquery.htm >>.
"Using Dynamic Queries", 2009, Microsoft Corporation, Retrieved at << http://msdn.microsoft.com/en-us/library/aa237255(SQL.80).aspx >>.
"Walkthrough—Using a Dynamic Query in a Report", 2009, Microsoft Corporation, Retrieved at << http://msdn.microsoft.com/en-us/library/aa237477(SQL.80).aspx.
"Dynamic Query Use in Building Data-Pull Reports ", Retrieved at << https://publib.boulder.ibm.com/infocenter/cqhelp/v7r1m0/index.jsp?topic=/com.ibm.rational.clearquest.user_ec.doc/topics/c_rpt_dpull_qry_dyn_filter.htm >>.
Joy, et al., "Introduction to the Database Template Library", 2002, Retrieved at << http://dtemplatelib.sourceforge.net/dtl_introduction.htm#_Toc500425987 >>.
"Generating Dynamic/Runtime Query", 2003-2008, DaniWeb, Retrieved at << http://www.daniweb.com/forums/thread88006.html#>>.

* cited by examiner

*Primary Examiner* — Rehana Perveen
*Assistant Examiner* — Scott A Waldron

(57) ABSTRACT

A programming model for a query service (e.g., web) that supports defining query builders which are bound dynamically at runtime to parameter values. Moreover, the programming model can be used to customize the query execution, for example, by adding pre-processing, post-processing, or dynamic binding to queries (e.g., selecting the query to be executed dynamically at runtime). As a consequence, generalized and parameterized queries can be used (with different runtime values for parameters) in different scenarios.

20 Claims, 7 Drawing Sheets

RUNTIME-DEFINED DYNAMIC QUERIES

BACKGROUND

The searching of vast amounts of data is becoming commonplace not only in the Internet, but in the business environment as well. The performant and effective query processing and results retrieval is an important part of a business. For example, generating and processing queries that return business information about clients from a business database in an efficient way can provide a competitive edge over the competition for the business.

Existing solutions provide fixed code and proprietary protocols and can depend on the specific database to which the solution is interfaced. Moreover, for interactive consumer applications that use a query service for executing queries, statically defined queries associated with proprietary solutions may not be sufficient. This makes it difficult if not impossible for third party users to adapt the solution to an existing database.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a programming model for a query service (e.g., web) that supports defining query builders which are bound dynamically at runtime to parameter values. Moreover, the programming model can be used to customize the query execution, for example, by adding pre-processing, post-processing, or dynamic binding to queries (e.g., selecting the query to be executed dynamically at runtime). As a consequence, generalized and parameterized queries can be used (with different runtime values for parameters) in different scenarios.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
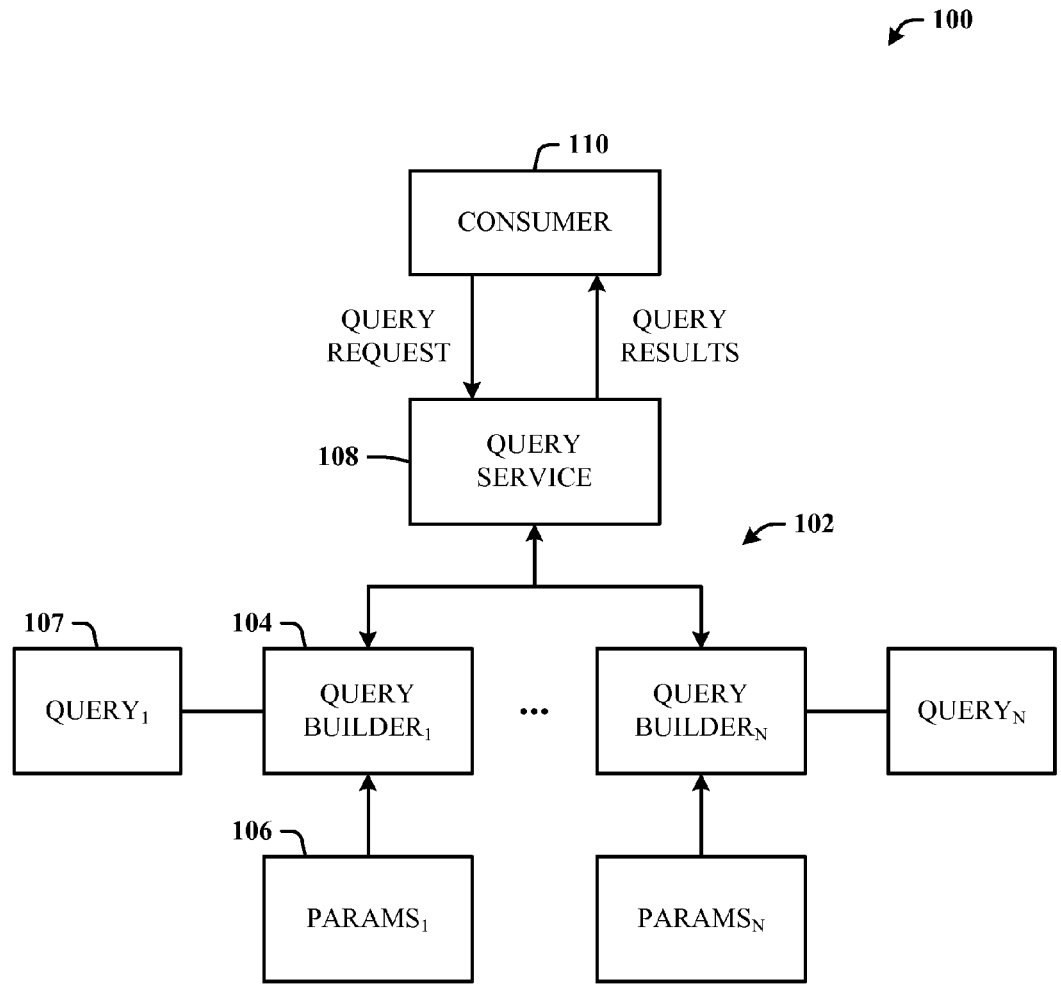
FIG. 1 illustrates a computer-implemented query system for runtime-defined dynamic queries in accordance with the disclosed architecture.

The disclosed architecture includes a query service that provides a stateless service interface to expose available data access functionality via a set of query classes (e.g., query, queryrun, querybuilder, etc.). Query and query run classes can be used to access data and build queries at runtime. The query service is capable of executing static, dynamic, and client-defined queries. Static queries are predefined queries that are referenced by name. Dynamic queries are built at runtime by classes implementing a certain interface, described herein below. Client-defined queries are defined by the caller and sent to the query service in the form of a query definition that fully describes the query. Additionally, the query service supports paging query results thereby limiting the amount of data returned in a single request while allowing the caller to retrieve data in amounts exceeding any preset limit. The disclosed paging mechanism addresses the challenges associated with the paging of query results that are non-rectangular. Paging in the case of dynamic queries is tricky because the schema of the result set may not be fully known at the time a request is sent to the query service executing a dynamic query; the described paging mechanism solves this problem as well (through bookmarks).

This data access pattern is stateful, in that data is processed a few records at a time until all the records satisfying the query conditions are retrieved. This pattern is not suitable for a stateless service, however. In order to transform this pattern into a stateless pattern, data needs to be accumulated in memory rather than processed, and a limited number of records should be retrieved (and accumulated) even if there are more records that satisfy the query conditions. Thereafter, the accumulated data is sent back to the caller.

In order to implement such a stateless pattern, a serializable data structure is used to store the data in memory while the data is being retrieved and then sent to the caller. This is accomplished using a memory-resident representation of data. Additionally, a way to stop a query and then restart the query from the same position is utilized. This can be accomplished by using paging capabilities.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented query system 100 for runtime-defined dynamic queries in accordance with the disclosed architecture. The system 100 includes one or more query builders 102 (Query Builder$_1$, . . . , Query Builder$_N$) for generating queries (Query) at runtime. Additionally, the one or more query builders 102 are each associated with query parameters (Params). For example, a first query builder 104 employs a first set of parameters 106 to create a first query 107. The first parameters 106 are bound dynamically at runtime for creation of the first query 107, and the first query 107 is created at query runtime using the bound first parameters 106.

A query service 108 is provided for receiving a query request from a consumer 110, accessing (directing the request to a referenced query builder) a query builder such as the first query builder 104, and returning query results to the consumer 110. The query results are based on the associated first query parameters 106.

A query builder (e.g., first query builder 104) is bound dynamically at runtime to generate the query (e.g., first query 107). The parameters (e.g., first parameters 106) of the query builder (e.g., first query builder 104) are bound dynamically at runtime. The query builder (e.g., first query builder 104) includes a method that stores the parameters for use by other methods, a method that initializes an instance of a custom query builder for passing custom parameters, a method that retrieves the query at runtime and/or a method that retrieves the query results for return to the consumer.

The programming model for the query service can be a web service that supports defining query templates (the query builders) that are bound dynamically at runtime to parameter values. Moreover, the programming model can be used to customize the query execution by adding pre-processing, post-processing, and/or even dynamic binding to queries (selecting the query to be executed dynamically at runtime), for example.

Figure 2:
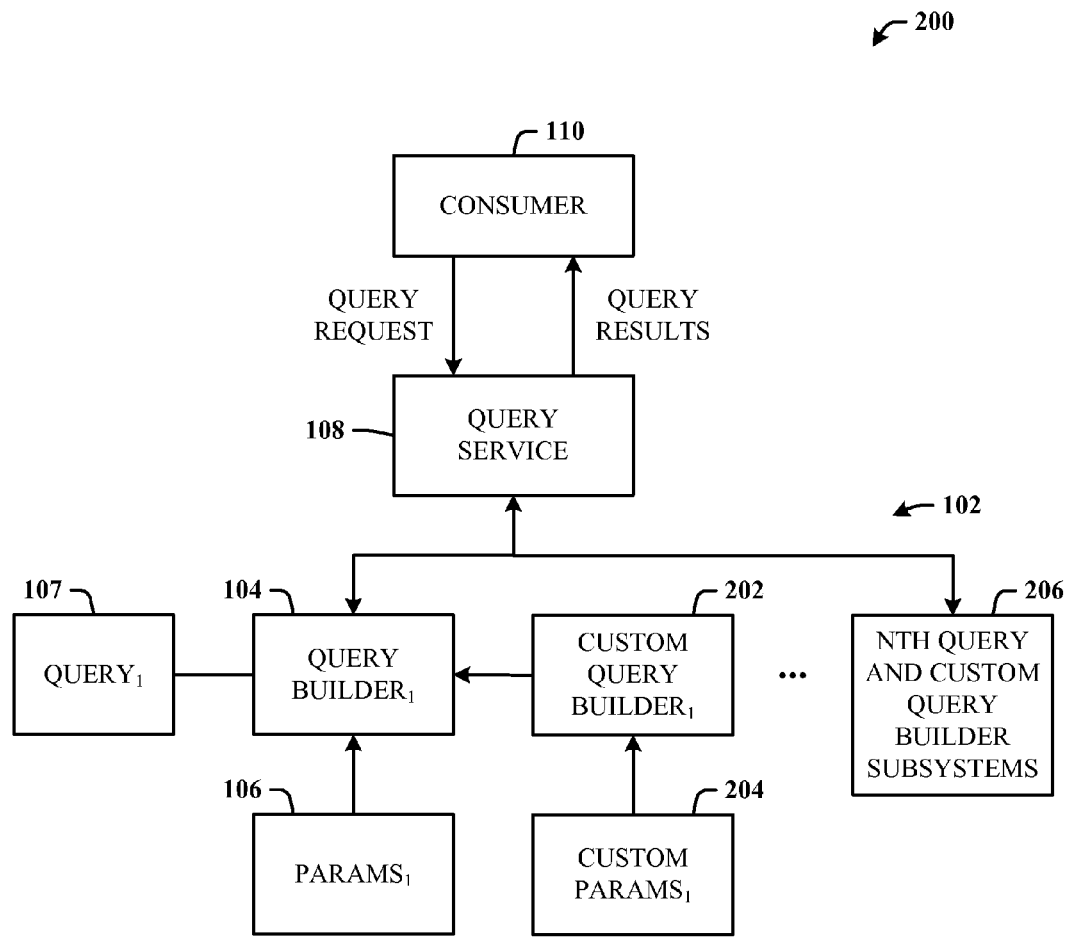
FIG. 2 illustrates an alternative embodiment of query system for runtime-defined dynamic queries that includes a custom query builder.

FIG. 2 illustrates an alternative embodiment of query system 200 for runtime-defined dynamic queries that includes a custom query builder 202. The custom query builder 202 can be initialized at runtime to input custom query parameters 204 to the query builder 104 as a replacement for the first query parameters 106. The first query 107 then is created based on the custom parameters 204. The system 200 can also include multiple query and custom query builder subsystems 206 such that the query service references a specific query builder subsystem based on the request received from the consumer.

Again, the programming model for the query service can be a web service that supports defining query templates (the query builders) that are bound dynamically at runtime to parameter values. Moreover, the programming model can be used to customize the query execution by adding pre-processing, post-processing, and/or even dynamic binding to queries (selecting the query to be executed dynamically at runtime), for example.

Put another way, a computer-implemented query system is provided that includes a query builder for generating a query at runtime, the query builder associated with query parameters, the query, and a query run. A custom query builder is associated with the query builder that is optionally initialized at runtime to input custom query parameters to the query builder as replacements for the query parameters, and a query service is provided for accessing the query builder for a consumer and returning query results to the consumer based on the query parameters or the custom query parameters.

The query parameters or the custom query parameters of the query builder are bound dynamically at runtime. The query builder includes a method that stores the query parameters for use by other methods and a method that initializes an instance of the custom query builder. The query builder includes a method that retrieves the query at runtime and a method that retrieves the query results of the query run for return to the consumer. The query parameters or the custom query parameters are employed at runtime to select a pre-existing query from a set of pre-existing queries. The query and the query run are created dynamically at runtime.

Figure 3:
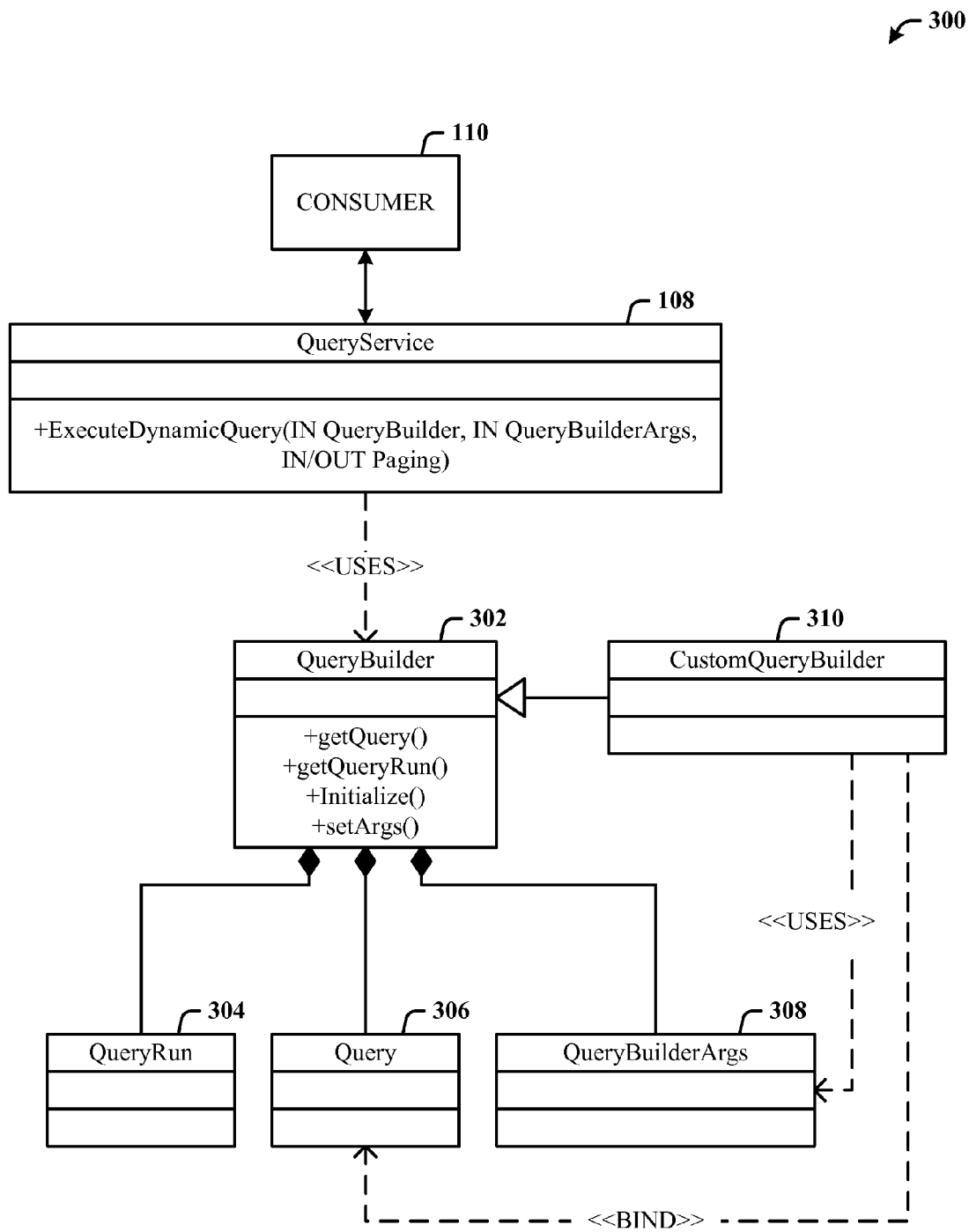
FIG. 3 illustrates a unified modeling language diagram of a query system for runtime-defined dynamic queries.

FIG. 3 illustrates a unified modeling language (UML) diagram of a query system 300 for runtime-defined dynamic queries. An application developer creates a subclass of class QueryBuilder 302, the subclass includes QueryRun 304, Query 306, and QueryBuilderArgs 308. Abstract methods are then implemented in the QueryBuilder 302. The class QueryBuilder 302 can use parameters (of type QueryBuilderArgs) that are bound only at runtime to dynamically create a query (e.g. from a pre-existing query, from a query that is created on-the-fly at runtime, etc.). The parameters can also be used, for instance, to select a query from a set of pre-existing queries, using the runtime parameters, for example.

An application developer developing an application (consumer 110) that retrieves data through the query service 108 can use a query service API to pass a reference to the QueryBuilder 302, as well as a parameter to define the query that is to be executed.

The query service 108 routes requests to the referenced query builder (QueryBuilder 302), passes on the parameters, and retrieves a query object from the query builder, which the query builder creates by executing application code. The query is used to create a query run, which the query builder also creates by executing application code. The query run is then executed and the results are returned to the calling application (consumer 110). Both query and query run are created at runtime by executing application code that is defined by an application developer. The application code can be parameterized, and parameter values are bound only at runtime, changing the shape of the query dynamically.

The programming model represented by system 300 can include the following artifacts: the base class QueryBuilder 302 having methods that include setArgs( ), initialize( ), getQuery( ), and getQueryRun( ), and other methods as desired. The setArgs( ) method is used to store the arguments of type QueryBuilderArgs for use by the other class methods. The initialize( ) method is used to initialize the instance of the CustomQueryBuilder subclass 310 at runtime to create a query and a query run, for example, based on runtime parameters. The getQuery( ) method is used to retrieve the query, and the getQueryRun( ) method is used to retrieve the query run.

At runtime, the query service 108 features an API, ExecuteDynamicQuery( ), which accepts parameters of type QueryBuilder and QueryBuilderArgs, among others (e.g., paging). When this API is invoked, the specified, concrete QueryBuilder subclass is invoked to set the parameters of type QueryBuilderArgs, to initialize the instance of the QueryBuilder subclass, to retrieve a query of type Query, and to retrieve a QueryRun that can be used to execute the query.

Following is a description of other aspects in support of runtime-defined dynamic queries.

Query builder classes are used to build a dataset schema from the query. In order for the dataset to contain the data coming from the query, the schema of the dataset (tables, columns, and relations) is made compatible with the schema of the query (data sources (tables), table fields, and relations). This schema can be obtained at runtime by using the query builder classes.

The query schema can map to the dataset schema as follows: each query data source becomes a data table with the same name, each table field becomes a column with the same name and a corresponding type, and all relations between the same data sources become a single multi-column unconstrained relation between corresponding tables. The data source of which relations are defined is assumed to play the child role and the related data source is considered to play the parent role.

The last aspect utilized to complete the stateless data retrieval pattern is a way to stop the query in order to limit the amount of data per request, and restart the query from the position where it was stopped. This is achieved through paging.

Query supports two paging modes: position-based and value-based. In order to do position-based paging the query accepts two parameters: the starting position and number of records to fetch. In order to do value-based paging, the query accepts one parameter: a lookup cursor. The cursor uniquely identifies a joined row and is used to position the query at a given point. The cursor has the same structure as the query and contains data in each joined cursor. This means that the lookup records are retrieved first.

Note that in one implementation, the query does not stop until it retrieves all records starting with the lookup record. Thus, in order to use value-based paging, a mechanism of limiting the number of records retrieved and returning to the caller the lookup cursor pointing to the first joined row that did not fit, is defined. Accordingly, the caller can define a record limit for each data source in the query, during the query run the number of unique records fetched from each data source is tracked, for each QueryRun.next( ) a check is made if all unique records fetched during the last call to it fit into the allotted space in the data set. Additionally, if any record does not fit, none of the newly fetched records are included into the dataset, instead, these records are used as a bookmark that is sent back to the caller in order to be passed in with the next query service request. Note, however, that bookmarks can be made opaque to the consumer of the service.

Thus, the parameters for a value-paged request can be:
- [in] startBookmark: an array of (dataSourceName, recId) pairs each identifying a record in the lookup cursor. This is null for the first request.
- [in] recordLimits: an array of (dataSourceName, recordLimit) pairs specifying the record limits for data sources. The limits can change from request to request. The limits are allowed to be partial (some data sources may have the limits specified and some data sources may not).
- [out] endBookmark: an array of (dataSourceName, recId) pairs each identifying a record in the joined row that did not fit into the allotted space. This is passed unchanged into the next request as startBookmark.

All query service operations take a paging parameter of the base abstract class Paging. All concrete paging parameters classes derive from the base class. The paging parameter is passed by reference which allows the service to update the input paging parameter so that it can be passed to the next request. In case of position-based paging, the starting position is updated. In case of value-based paging, the bookmark is updated.

Value-based paging parameters can be represented by three classes:
- ValueBasedPaging: allows the caller to specify a single record limit to be used for all data sources in the query.
- TopLevelValueBasedPaging: allows the caller to specify a single record limit to be used on top level data sources only.
- AdvancedValueBasedPaging: allows the caller to specify record limits for each data source separately.

Figure 4:
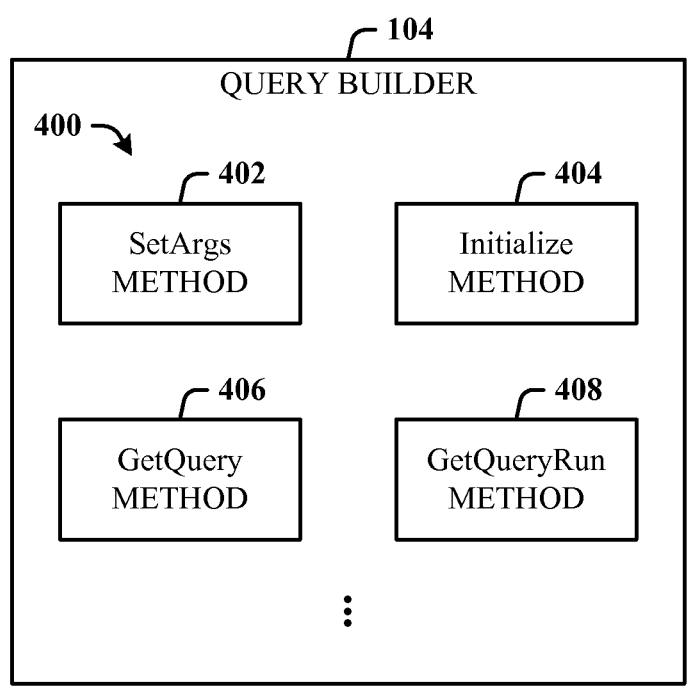
FIG. 4 illustrates methods that can be utilized in the query builder.

FIG. 4 illustrates methods 400 that can be utilized in the query builder 104. Static and client-defined queries cover many scenarios; however, oftentimes the query needs to be defined programmatically at runtime on the server. For these scenarios, the query service supports dynamically built queries. In order to enable these scenarios, the business logic for defining the query (both static and dynamic behaviors) can be encapsulated in an X++ class derived from a base framework X++ class QueryBuilder. Although described in the context of the X++ object oriented language, it is to be understood that other programming languages can be employed to achieve similar results.

QueryBuilder is an abstract class that can include the following methods:
- [in] QueryBuilderArgs setArgs: the query service uses the setArgs method 402 to pass the caller specified query builder parameters [in] to the query builder. QueryBuilderArgs is an abstract class that serves as a base for all concrete Args classes that include parameters specific to concrete query builders, for example, class MyQueryBuilderArgs extends QueryBuilderArgs { . . . }
- void initialize( ): the initialize( ) method 404 is called by the query service after the paging and Args are set. This is where the query builder creates the query and the query run that is used by the query service.
- [out] Query getQuery( ): the getQuery method 406 returns an initialized query object. The returned query object is used to derive the schema of the output dataset, and also used as a bookmark query if the query builder does not override the paging.
- [out] QueryRun getQueryRun( ): the getQueryRun method 408 returns an initialized QueryRun object that is used for query execution.

Other methods that can be employed for the QueryBuilder class can include the following:
- [in] QueryPaging parmPaging( ): the query service uses this method to pass the caller (consumer application) specified paging parameters [in] to the query builder. QueryPaging is an abstract class that serves as a base for all derived concrete paging parameter classes. The X++ paging class hierarchy mirrors the paging data contract hierarchy.
- [out] Boolean parmIsPagingOverriden( ): this method tells the query service whether the query builder handles paging internally. This returns True, if the query builder performs paging internally and getQueryRun returns an already paged query run; otherwise, the query service performs paging requested by the caller as well as handles the output paging parameters.
- [out] parmRecordLimits( ): if the query builder performs paging internally (parmIsPagingOverriden returns True), this method is implemented. The query service uses this method to get the data source record limits.
- QueryPaging getOutputPaging( ): if the query builder performs paging internally (parmIsPagingOverriden returns True), this method is implemented. The query service uses this method to get the output paging parameters. Note that the output paging parameters are updated according to the state of the query run object.

QueryBuilder provides the default implementation for all methods, except initialize( ). initialize( ) is abstract and is implemented by the derived classes. Other methods can be overridden to take greater control of the query construction and execution.

Scenarios enabled by dynamic queries include, but are not limited to: using a static query and adding some data sources and/or ranges at runtime based on incoming parameters and/or state of the system (e.g., configuration, settings, etc.), reusing existing query building logic for other purposes, returning a subset of the data when the runtime query, in order to run correctly, needs to have more data sources than is desirable to return, and the data to be returned is built by business logic inside the query builder. The query builder uses complex query (or queries) in order to build the requested data.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
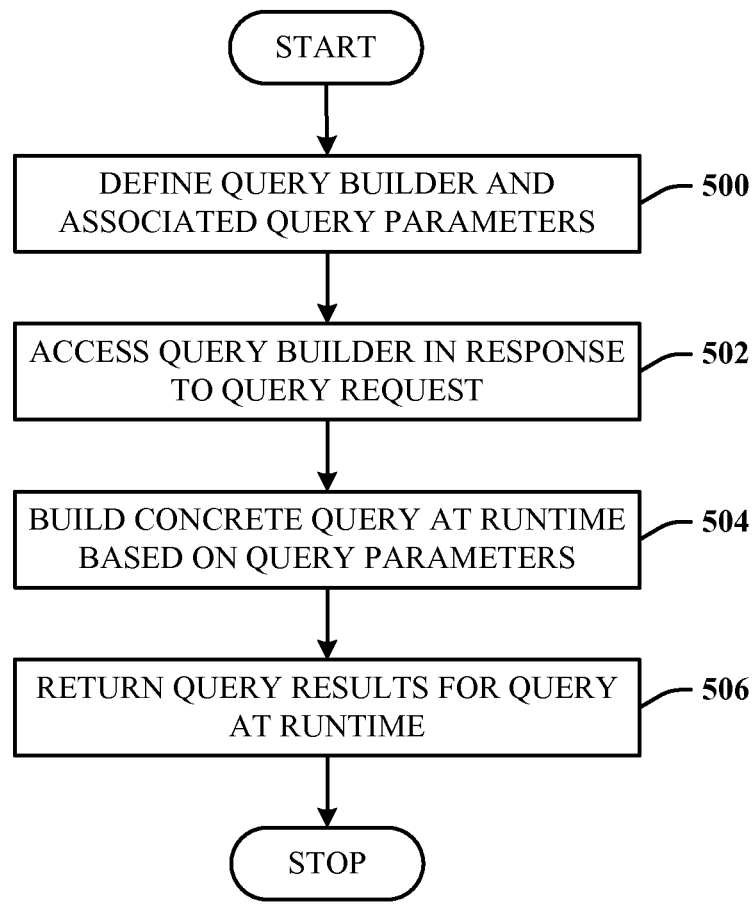
FIG. 5 illustrates a query method for runtime defined dynamic queries.

FIG. 5 illustrates a query method for runtime defined dynamic queries. At 500, a query builder and associated query parameters are defined. At 502, the query builder is accessed in response to a query request. At 504, a concrete query is built at runtime based on the query parameters. At 506, query results for the query are returned at runtime.

Figure 6:
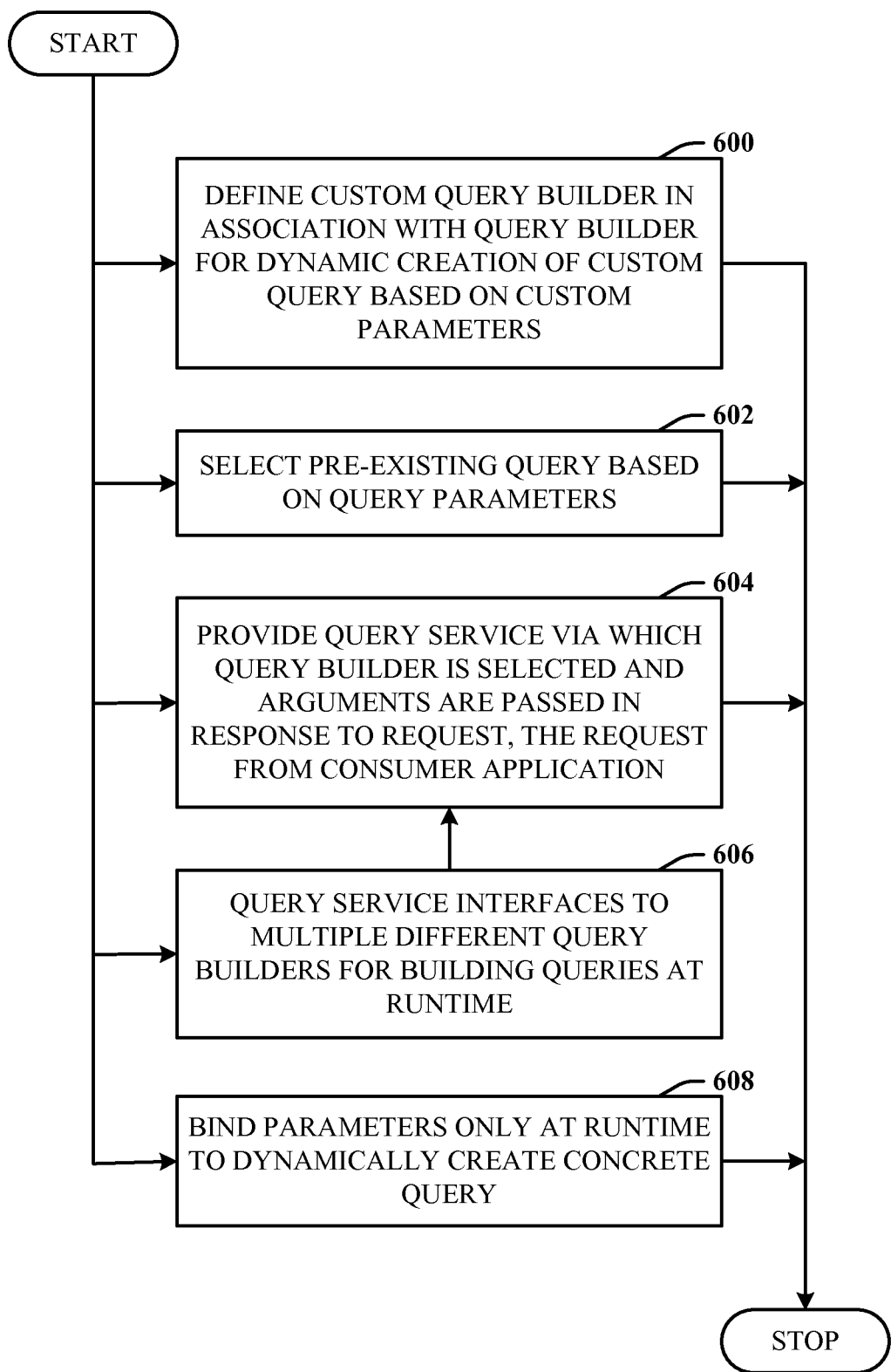
FIG. 6 illustrates further aspects of the query method of FIG. 5.

FIG. 6 illustrates further aspects of the query method of FIG. 5. At 600, a custom query builder is defined in association with the query builder for dynamic creation of a custom query based on custom parameters. At 602, a pre-existing query is selected based on the query parameters. Selecting a pre-existing query based on the query parameters is just one way for a query builder to create a query. A query builder is not limited to any specific way or a set of ways of creating queries. Methods of building queries employed by query builders can range from simply selecting a pre-existing query, to starting with a pre-existing query and modifying it a little, to starting with a pre-existing query and modifying it a lot, to building a query from scratch. All methods can be parameterized by the passed-in query builder parameters (e.g., at runtime). The query builder parameters are not limited to any specific set of parameters and can be defined by the query builder author (an application programmer) according with the logic implemented by the query builder.

At 604, a query service is provided via which the query builder is selected and arguments are passed in response to the request, the request from a consumer application. At 606, the query service interfaces to multiple different query builders for building corresponding queries at runtime. At 608, the parameters are bound only at runtime to dynamically create the concrete query.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
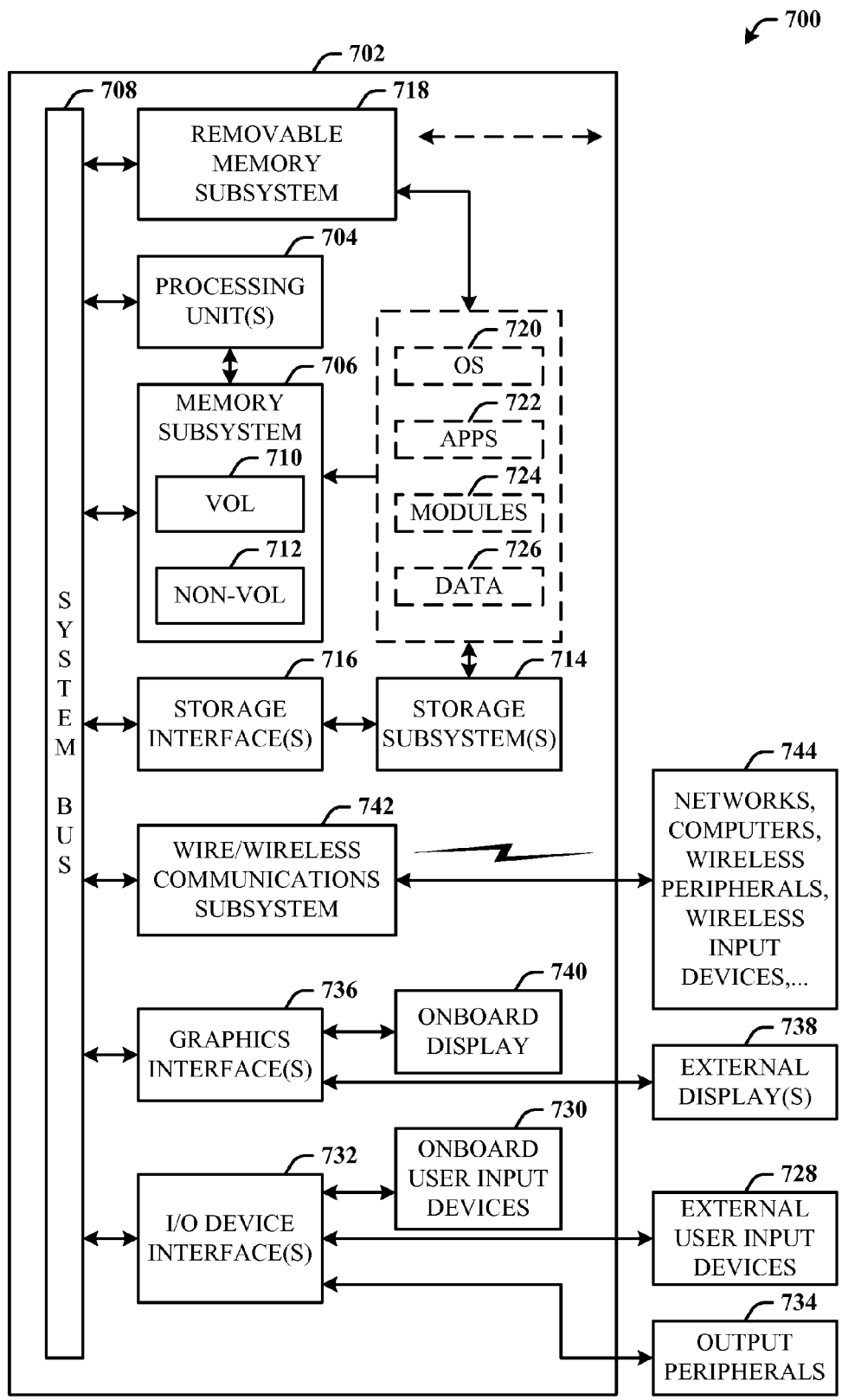
FIG. 7 illustrates a block diagram of a computing system operable to execute runtime-defined dynamic queries in accordance with the disclosed architecture.

Referring now to FIG. 7, there is illustrated a block diagram of a computing system 700 operable to execute runtime-defined dynamic queries in accordance with the disclosed architecture. In order to provide additional context for various aspects thereof, FIG. 7 and the following discussion are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

Where the computer system 702 is employed as a server machine, the one or more application programs 722, other program modules 724, and program data 726 can include the system 100 and associated entities (e.g., first query builder 104, first query 107, etc.) of FIG. 1, the system 200 and associated entities of FIG. 2, the system 300 and entities of FIG. 3, the methods of FIG. 4, and the method and steps represented in the flow charts of FIGS. 5 and 6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile media, removable and non-removable media. For the computer 702, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented query system, comprising:
a server including memory and a processing unit for executing computer-executable components, the memory storing computer-executable components including:
a programming model for providing a web service that supports defining a concrete custom query builder subclass derived from a query builder base class included in the programming model and defining a concrete arguments class that extends an arguments base class included in the programming model, wherein:
the query builder base class is configured to use query parameters of the arguments base class to create queries;
the concrete arguments class includes one or more custom query parameters specific to the concrete custom query builder subclass;
the concrete custom query builder subclass is configured to dynamically create a custom query at runtime using parameter values of the one or more custom query parameters which are to be bound to the concrete custom query builder subclass at runtime;
the concrete custom query builder subclass uses the custom query to dynamically create a query run at runtime, wherein the query run is configured to execute the custom query for returning query results based on the one or more custom query parameters; and the query builder base class includes a method for initializing an instance of the custom query builder subclass at runtime and a method for retrieving the query run created by the concrete query builder subclass; and a query service for providing an interface to expose data access functionality via the query builder base class included in the programming model, wherein the query service is configured to:

accept, from a consumer application at runtime, a query request that includes a reference to the concrete custom query builder subclass;

invoke the concrete custom query builder subclass to initialize the instance of the concrete custom query builder subclass and retrieve the query run created by the concrete custom query builder subclass;

execute the query run created by the concrete custom query builder subclass for retrieving the query results based on the one or more custom query parameters; and return the query results to the consumer application at runtime.

2. The system of claim 1, wherein the query service is configured to:

execute a static query in response to receiving a query request that includes a name of the static query; and execute a client-defined query in response to receiving a query request that includes a query definition which fully describes the client-defined query.

3. The system of claim 1, wherein the query service accepts one or more paging parameters for specifying a record limit for the query results.

4. The system of claim 1, wherein the query builder base class further includes:

a method that stores arguments of the arguments base class for use by other methods.

5. The system of claim 1, wherein the query builder base class further includes:

a method that returns an initialized query object to the query service at runtime.

6. The system of claim 5, wherein the initialized query object is used by the query service to derive a schema of the query results.

7. The system of claim 1, wherein the custom query is created at runtime by modifying a pre-existing query which is selected from a set of pre-existing queries based on the one or more custom query parameters.

8. The system of claim 1, wherein the custom query is used to add a range based on the one or more custom query parameters.

9. A computer-implemented method, comprising:

providing, on a server, a programming model for providing a web service that supports defining a concrete custom query builder subclass derived from a query builder base class included in the programming model and defining a concrete arguments class that extends an arguments base class included in the programming model, wherein:

the query builder base class is configured to use query parameters of the arguments base class to create queries;

the concrete arguments class includes one or more custom query parameters specific to the concrete custom query builder subclass;

the concrete custom query builder subclass is configured to dynamically create a custom query at runtime using parameter values of the one or more custom query parameters which are to be bound to the concrete custom query builder subclass at runtime;

the concrete custom query builder subclass uses the custom query to dynamically create a query run at runtime, wherein the query run is configured to execute the custom query for returning query results based on the one or more custom query parameters; and the query builder base class includes a method for initializing an instance of the custom query builder subclass at runtime and a method for retrieving the query run created by the concrete query builder subclass;

providing, on the server, a query service that provides an interface to expose data access functionality via the query builder base class included in the programming model;

accepting, by the query service from a consumer application at runtime, a query request that includes a reference to the concrete custom query builder subclass;

invoking, by the query service, the concrete custom query builder subclass to initialize the instance of the concrete custom query builder subclass and retrieve the query run created by the concrete custom query builder subclass;

executing, by the query service, the query run created by the concrete custom query builder subclass for retrieving the query results based on the one or more custom query parameters; and returning, by the query service, the query results to the consumer application at runtime.

10. The method of claim 9, further comprising:

accepting, by the query service, one or more paging parameters for specifying a record limit for the query results.

11. The method of claim 9, wherein the query service is configured to:

execute a static query in response to receiving a query request that includes a name of the static query, and execute a client-defined query in response to receiving a query request that includes a query definition which fully describes the client-defined query.

12. The method of claim 9, wherein the query builder base class further includes:

a method that returns an initialized query object to the query service at runtime.

13. The method of claim 12, wherein the initialized query object is used by the query service to derive a schema of the query results.

14. The method of claim 9, wherein the custom query is used to add a range based on the one or more custom query parameters.

15. A computer-readable storage device storing computer-executable instructions that, when executed by a server computer, cause the server computer to perform a method, comprising:

providing, on the server computer, a programming model for providing a web service that supports defining a concrete custom query builder subclass derived from a query builder base class included in the programming model and defining a concrete arguments class that extends an arguments base class included in the programming model, wherein:

the query builder base class is configured to use query parameters of the arguments base class to create queries;

the concrete arguments class includes one or more custom query parameters specific to the concrete custom query builder subclass;

the concrete custom query builder subclass is configured to dynamically create a custom query at runtime using parameter values of the one or more custom query parameters which are to be bound to the concrete custom query builder subclass at runtime;

the concrete custom query builder subclass uses the custom query to dynamically create a query run at runtime, wherein the query run is configured to execute the custom query for returning query results based on the one or more custom query parameters; and the query builder base class includes a method for initializing an instance of the custom query builder subclass at runtime and a method for retrieving the query run created by the concrete query builder subclass;

providing, on the server computer, a query service that provides an interface to expose data access functionality via the query builder base class included in the programming model;

accepting, by the query service from a consumer application at runtime, a query request that includes a reference to the concrete custom query builder subclass;

invoking, by the query service, the concrete custom query builder subclass to initialize the instance of the concrete custom query builder subclass and retrieve the query run created by the concrete custom query builder subclass;

executing, by the query service, the query run created by the concrete custom query builder subclass for retrieving the query results based on the one or more custom query parameters; and returning, by the query service, the query results to the consumer application at runtime.

16. The computer-readable storage device of claim 15, further storing computer-executable instructions for:

accepting, by the query service, one or more paging parameters for specifying a record limit for the query results.

17. The computer-readable storage device of claim 15, wherein the query builder base class includes:

a method that returns an initialized query object to the query service at runtime.

18. The computer-readable storage device of claim 17, wherein the initialized query object is used by the query service to derive a schema of the query results.

19. The computer-readable storage device of claim 15, wherein the custom query is used to add a range based on the one or more custom query parameters.

20. The computer-readable storage device of claim 15, wherein the custom query is created at runtime by modifying a pre-existing query which is selected from a set of pre-existing queries based on the one or more custom query parameters.

\* \* \* \* \*